US007632561B2

(12) United States Patent
Thiers

(10) Patent No.: US 7,632,561 B2
(45) Date of Patent: Dec. 15, 2009

(54) LAMINATE FLOOR COVERING PANEL HAVING WOOD PATTERN

(75) Inventor: Bernard Paul Joseph Thiers, Oostrozebeke (BE)

(73) Assignee: Flooring Industries Limited, Sarl, Bertrange (LU)

( * ) Notice: Subject to any disclaimer, the term of this patent is extended or adjusted under 35 U.S.C. 154(b) by 9 days.

(21) Appl. No.: 11/400,189

(22) Filed: Apr. 10, 2006

(65) Prior Publication Data

US 2006/0179772 A1 Aug. 17, 2006

Related U.S. Application Data

(63) Continuation of application No. 10/923,780, filed on Aug. 24, 2004, now Pat. No. 7,055,290, which is a continuation of application No. 10/395,162, filed on Mar. 25, 2003, now Pat. No. 6,931,811, which is a continuation of application No. 09/878,212, filed on Jun. 12, 2001, now abandoned.

(30) Foreign Application Priority Data

Jun. 13, 2000 (BE) ................................ 2000/0381

(51) Int. Cl.
*E04F 15/10* (2006.01)
*B32B 3/02* (2006.01)

(52) U.S. Cl. ......................... 428/151; 52/316; 52/592.4

(58) Field of Classification Search ................ 52/592.2, 52/589.1, 592.1, 390, 992.1, 592.4, 316, 52/314; 427/369, 393, 142, 151, 192; 428/141, 428/142, 151, 156, 172, 192
See application file for complete search history.

(56) References Cited

U.S. PATENT DOCUMENTS

| | | | |
|---|---|---|---|
| 444,042 | A | 1/1891 | Brock |
| 714,838 | A | 12/1902 | Wagner |
| 1,551,544 | A | 9/1925 | Crooks |
| 2,108,226 | A | 2/1938 | Johnston |
| 2,226,540 | A | 12/1940 | Boettcher |
| 2,328,051 | A | 8/1943 | Bull |
| 3,204,380 | A | 9/1965 | Smith et al. |
| 3,373,068 | A | 3/1968 | Grosheim et al. |
| 3,452,861 | A | 7/1969 | Erwin |
| 3,474,706 | A | 10/1969 | Wheeler |
| 3,576,711 | A | 4/1971 | Baldwin et al. |

(Continued)

FOREIGN PATENT DOCUMENTS

DE 19602064 C1 3/1997

(Continued)

OTHER PUBLICATIONS

Fantoni Plaxil MDF—published before Jun. 13, 2000.

(Continued)

*Primary Examiner*—Michael Safavi
(74) *Attorney, Agent, or Firm*—Bacon & Thomas, PLLC

(57) ABSTRACT

Floor covering, consisting of hard panels, with a laminated structure, whereby at least at the upper surface a printed decorative layer with a wood pattern is present, with thereupon a transparent layer of synthetic material in which impressions are formed, wherein the impressions substantially follow the wood pattern.

9 Claims, 4 Drawing Sheets

U.S. PATENT DOCUMENTS

| | | | | | |
|---|---|---|---|---|---|
| 3,654,044 | A | | 4/1972 | Hirota | |
| 3,698,978 | A | | 10/1972 | McQuade, Jr. | |
| 3,720,027 | A | | 3/1973 | Christensen | |
| 3,740,914 | A | | 6/1973 | Diez | |
| 3,814,647 | A | | 6/1974 | Scher et al. | |
| 3,870,591 | A | | 3/1975 | Witman | |
| 3,878,030 | A | | 4/1975 | Cook | |
| 3,887,678 | A | | 6/1975 | Lewicki, Jr. | |
| 3,948,173 | A | | 4/1976 | Barasch | |
| 3,953,639 | A | | 4/1976 | Lewicki, Jr. | |
| 3,978,258 | A | | 8/1976 | Faust et al. | |
| 4,033,082 | A | | 7/1977 | Tashiro | |
| 4,062,992 | A | | 12/1977 | Power et al. | |
| 4,092,199 | A | | 5/1978 | Ungar et al. | |
| 4,093,766 | A | | 6/1978 | Scher et al. | |
| 4,118,533 | A | | 10/1978 | Hipchen et al. | |
| 4,131,663 | A | | 12/1978 | Lewicki, Jr. | |
| 4,131,705 | A | | 12/1978 | Kubinsky | |
| 4,136,224 | A | * | 1/1979 | Minami et al. | 428/161 |
| 4,237,087 | A | | 12/1980 | Jones | |
| 4,284,453 | A | | 8/1981 | Endrizzi | |
| 4,290,248 | A | | 9/1981 | Kemerer et al. | |
| RE30,891 | E | * | 3/1982 | Baratto | 428/142 |
| 4,333,288 | A | | 6/1982 | Coombs | |
| 4,363,271 | A | | 12/1982 | Horst | |
| 4,367,110 | A | | 1/1983 | Yoshikawa | |
| 4,376,812 | A | | 3/1983 | West | |
| 4,388,133 | A | * | 6/1983 | Hirao et al. | 156/245 |
| 4,396,448 | A | | 8/1983 | Ohta et al. | |
| 4,426,820 | A | * | 1/1984 | Terbrack et al. | 52/590.1 |
| 4,500,373 | A | | 2/1985 | Kubota | |
| 4,557,779 | A | | 12/1985 | Bower et al. | |
| 4,581,255 | A | | 4/1986 | Coggan et al. | |
| 4,585,685 | A | | 4/1986 | Forry et al. | |
| 4,599,127 | A | | 7/1986 | Cannady, Jr. et al. | |
| 4,610,900 | A | * | 9/1986 | Nishibori | 428/15 |
| 4,612,074 | A | | 9/1986 | Smith et al. | |
| 4,625,491 | A | | 12/1986 | Gibson | |
| 4,646,634 | A | | 3/1987 | Espe | |
| 4,675,212 | A | | 6/1987 | Wiley et al. | |
| 4,689,102 | A | | 8/1987 | Prawdzik et al. | |
| 4,773,959 | A | | 9/1988 | Smith et al. | |
| 4,864,790 | A | | 9/1989 | Liardet | |
| 4,953,335 | A | | 9/1990 | Kawaguchi et al. | |
| 5,112,671 | A | * | 5/1992 | Diamond et al. | 428/156 |
| 5,136,823 | A | | 8/1992 | Pellegrino | |
| 5,141,799 | A | | 8/1992 | Mehta et al. | |
| 5,226,273 | A | | 7/1993 | Burke | |
| 5,271,699 | A | * | 12/1993 | Barre et al. | 409/132 |
| 5,283,102 | A | | 2/1994 | Sweet et al. | |
| 5,314,554 | A | | 5/1994 | Owens | |
| 5,335,473 | A | | 8/1994 | Chase | |
| 5,381,638 | A | | 1/1995 | Andersson | |
| 5,413,834 | A | | 5/1995 | Hunter et al. | |
| 5,437,934 | A | | 8/1995 | Witt et al. | |
| 5,502,939 | A | | 4/1996 | Zadok et al. | |
| 5,506,031 | A | * | 4/1996 | Spain et al. | 428/172 |
| 5,525,394 | A | | 6/1996 | Clarke et al. | |
| 5,570,554 | A | | 11/1996 | Searer | |
| 5,601,930 | A | | 2/1997 | Mehta et al. | |
| 5,618,602 | A | | 4/1997 | Nelson | |
| 5,662,977 | A | | 9/1997 | Spain et al. | |
| 5,681,428 | A | | 10/1997 | Nakajima et al. | |
| 5,713,173 | A | | 2/1998 | Von Langsdorff et al. | |
| 5,723,221 | A | | 3/1998 | Brooker et al. | |
| 5,736,227 | A | | 4/1998 | Sweet et al. | |
| 5,744,220 | A | * | 4/1998 | Ringo | 428/195.1 |
| 5,755,068 | A | * | 5/1998 | Ormiston | 52/314 |
| 5,797,237 | A | | 8/1998 | Finkell, Jr. | |
| 5,804,285 | A | | 9/1998 | Kobayashi et al. | |
| 5,827,592 | A | | 10/1998 | Van Gulik et al. | |
| 5,834,081 | A | | 11/1998 | Fanti | |
| 5,858,160 | A | * | 1/1999 | Piacente et al. | 156/279 |
| 5,928,762 | A | * | 7/1999 | Aizawa et al. | 428/156 |
| 5,961,903 | A | * | 10/1999 | Eby et al. | 264/46.5 |
| 6,006,486 | A | * | 12/1999 | Moriau et al. | 52/589.1 |
| 6,013,350 | A | | 1/2000 | Mizuno | |
| 6,032,425 | A | | 3/2000 | Gugliotti et al. | |
| 6,093,473 | A | | 7/2000 | Min | |
| 6,101,778 | A | | 8/2000 | Martensson | |
| 6,114,008 | A | | 9/2000 | Eby et al. | |
| 6,131,355 | A | | 10/2000 | Groh et al. | |
| 6,156,402 | A | | 12/2000 | Smith | |
| 6,182,401 | B1 | | 2/2001 | McManus et al. | |
| 6,224,698 | B1 | | 5/2001 | Endo | |
| 6,247,285 | B1 | * | 6/2001 | Moebus | 52/589.1 |
| 6,324,803 | B1 | | 12/2001 | Pervan | |
| 6,324,809 | B1 | | 12/2001 | Nelson | |
| 6,332,733 | B1 | | 12/2001 | Hamberger et al. | |
| 6,363,677 | B1 | | 4/2002 | Chen et al. | |
| 6,401,415 | B1 | * | 6/2002 | Garcia | 52/311.1 |
| 6,421,970 | B1 | | 7/2002 | Martensson et al. | |
| 6,440,538 | B1 | | 8/2002 | Ungar | |
| 6,479,128 | B1 | * | 11/2002 | Schafernak et al. | 428/106 |
| 6,517,674 | B1 | | 2/2003 | Das | |
| 6,551,678 | B1 | | 4/2003 | O'Brien et al. | |
| 6,565,919 | B1 | * | 5/2003 | Hansson et al. | 427/203 |
| 6,581,351 | B2 | | 6/2003 | DeVivi | |
| 6,606,834 | B2 | * | 8/2003 | Martensson et al. | 52/578 |
| 6,617,009 | B1 | | 9/2003 | Chen et al. | |
| 6,675,545 | B2 | | 1/2004 | Chen et al. | |
| 6,688,061 | B2 | | 2/2004 | Garcia | |
| 6,804,926 | B1 | | 10/2004 | Eisermann | |
| 6,931,811 | B2 | * | 8/2005 | Thiers | 52/592.1 |
| 7,055,290 | B2 | * | 6/2006 | Thiers | 52/592.2 |
| 7,249,445 | B2 | * | 7/2007 | Thiers | 52/592.1 |
| 2001/0012555 | A1 | * | 8/2001 | Miller et al. | 428/156 |
| 2002/0100231 | A1 | * | 8/2002 | Miller et al. | 52/177 |
| 2002/0110669 | A1 | | 8/2002 | Garcia | |
| 2003/0208980 | A1 | * | 11/2003 | Miller et al. | 52/592.1 |

FOREIGN PATENT DOCUMENTS

| | | | | |
|---|---|---|---|---|
| DE | 29811995 | U1 | | 12/1998 |
| DE | 29911244 | U1 | | 12/1999 |
| DE | 19929635 | A1 | | 2/2000 |
| DE | 20014309 | U1 | | 5/2001 |
| DE | 200206460 | U1 | | 8/2002 |
| EP | 0009813 | | | 4/1980 |
| EP | 0014901 | | | 9/1980 |
| EP | 0020001 | | | 12/1980 |
| EP | 0095046 | | | 11/1983 |
| EP | 0214643 | | | 3/1987 |
| EP | 0528059 | A1 | | 2/1993 |
| EP | 0785094131 | B1 | | 7/1997 |
| EP | 0914972 | B1 | | 5/1999 |
| EP | 1 153 736 | | * | 11/2001 |
| EP | 1153736 | A1 | | 11/2001 |
| ES | 163421 | | | 9/1971 |
| ES | 460194 | | | 6/1978 |
| ES | 283331 | | | 1/1986 |
| ES | 1019585 | | | 4/1992 |
| FR | 1489710 | | | 7/1967 |
| FR | 2623544 | | | 11/1987 |
| GB | 2035204 | A | | 6/1980 |
| GB | 2054458 | A | | 2/1981 |
| GB | 1588383 | | | 4/1981 |
| GB | 2088280 | A | | 6/1982 |
| GB | 2256023 | | | 11/1992 |
| JP | 4-24935 | | | 2/1992 |
| JP | 4-327979 | | | 11/1992 |
| JP | 5-18162 | | | 1/1993 |
| JP | 6-320510 | | | 11/1994 |
| JP | 7-76923 | | | 3/1995 |

| | | | |
|---|---|---|---|
| JP | 7-180333 | | 7/1995 |
| JP | 8-109734 | | 4/1996 |
| JP | 8-270172 | | 10/1996 |
| JP | 9-88315 | | 3/1997 |
| JP | 10-102743 | | 4/1998 |
| JP | 10/183964 | | 7/1998 |
| JP | 10/252251 | | 9/1998 |
| JP | 11-321064 | | 11/1999 |
| WO | 95/06176 | | 3/1995 |
| WO | 97/13626 | | 4/1997 |
| WO | WO97/19232 | * | 5/1997 |
| WO | 99/00213 | | 6/1997 |
| WO | 97/31775 | | 9/1997 |
| WO | 97/31776 | | 9/1997 |
| WO | 97/47834 | | 12/1997 |
| WO | 01/33011 | | 5/2001 |
| WO | WO 01/48333 A1 | | 7/2001 |

OTHER PUBLICATIONS

Brochure of Leonhard Kurz GmbH & Co—published before Mar. 1999.

Technical Information—MDF Medium Density Fiberboard. "Laminating Techniques for MDF (2)." Euro MDF Board. 1990.

A user's manual concerned with the manufacture, availability and processing of medium density fibreboard for the furniture, fitments and building industries. Euro MDF Board. Jan. 1993, pp. 67-69, 85,88, and 89.

Arbeitskreis MDF. Brochure of Kurz GmbH & Co., Germany. (1988), pp. 116-120.

Parquet Floors Adelant Feb. 3, 2000 (Mar. 2000).

* cited by examiner

LAMINATE FLOOR COVERING PANEL HAVING WOOD PATTERN

CROSS REFERENCE TO RELATED APPLICATION

This application is a continuation of U.S. patent application Ser. No. 10/923,780 filed Aug. 24, 2004, now U.S. Pat. No. 7,055,290, which is a continuation of U.S. patent application Ser. No. 10/395,162 filed Mar. 25, 2003, now U.S. Pat. No. 6,931,811, which is a continuation of patent application Ser. No. 09/878,212, filed Jun. 12, 2001, abandoned.

FIELD OF THE INVENTION

This invention relates to a floor covering, more particularly of the type consisting of hard panels, as well as to floor panels for forming such floor covering, and a method for realizing such floor panels.

In particular, it relates to a floor covering formed of laminated panels, also called laminated parquet.

BACKGROUND OF THE INVENTION

It is known that with such laminated parquet, the appearance of wood is imitated by providing the floor panels at their upper surface with a decorative layer printed with a wood pattern, on top of which a transparent layer of synthetic material is provided.

Mostly, the printed decorative layer consists of printed paper. Usually, the layer of synthetic material consists of a synthetic resin or one or more transparent or translucent material layers soaked in synthetic resin, in which possibly products can be worked in, in order to enhance, for example, the wear and tear resistance of the final surface.

The printed decorative layer and the layer of synthetic material are provided on an underlying basic layer, which can be realized according to different techniques.

So, for example, this is possible by soaking the decorative layer in resin and bringing it, after hardening, together with said layer of synthetic material, which then preferably also consists of a thin transparent paper layer also soaked in resin, and together with a basic layer and possible other layers, into a press and compressing it, under the supply of heat, to one hardened whole. This technique is known under the denomination of DPL (Direct Pressure Laminate).

Of course, other techniques are possible, too. So, for example, first a top layer may be formed which, amongst others, comprises the aforementioned decorative layer and the layer of synthetic material present thereupon, after which this top layer is attached on a basic layer or basic structure.

Also, said basic layer may consist of different materials or material layers. A material often used to this end is MDF (Medium Density Fibre board), HDF (High Density Fibre board), respectively.

It is also known that impressions can be realized in the transparent layer of synthetic material, this in order to obtain an imitation of wood pores and other unevennesses which can be present at the surface of real wood. With the known embodiments, this is performed by simply providing a series of impressions in the floor panels, which impressions substantially extend according to one and the same direction. Notwithstanding the use of such impressions, the known embodiments show the disadvantage that the imitation effect still is not optimum. So, for example, they show the disadvantage that if one looks at such floor panels at a relatively small angle, a light refraction at the transparent layer of synthetic matter is created, as a result of which only a glossy surface can be seen, without any visible effect of the actual print being perceived.

SUMMARY OF THE INVENTION

The invention aims at a floor covering, and more particularly at floor panels, whereby the top layer has technical characteristics which contribute to a considerable improvement of the imitation of the wood pattern, or at least the visual perception of this wood pattern, and whereby the aforementioned disadvantages of the known embodiments are minimized.

To this aim, the invention thus relates to a floor covering, consisting of hard panels, with a laminated structure, whereby at least at the upper surface a printed decorative layer with a wood pattern is present, with thereupon a transparent layer of synthetic material in which impressions are formed, with as a characteristic that the impressions substantially follow the wood pattern, with which it is meant that they substantially are provided in function of the wood pattern. Hereby, it is preferred that the impressions follow the wood pattern substantially in longitudinal direction as well as substantially in transverse direction and in directions situated in between.

Thereby, a technical solution is offered for letting the printed pattern seem more real, without the necessity of refining the printing technique itself in an expensive manner, which is very important with laminated panels provided with such printed pattern. By having the impressions run not only substantially according to one well-defined direction, then, when a person moves over the floor covering, an effect is obtained that the light incidence moves, as a result of which, so to speak, a living light effect is created. Also, a better depth effect is obtained, and the colours of the printed pattern are better perceptible.

As usual with the known laminated parquet panels, the printed decorative layer preferably consists of paper, however, other materials, either on the basis of cellulose or not, are not excluded. Moreover, this decorative layer can be processed in different manners, for example, previous to the application thereof on the underlying basic layer, soaked in synthetic resin or such.

The aforementioned layer of synthetic material, which, according to the invention, is situated on top of the decorative layer, can be composed in any manner. By "transparent layer of synthetic material", it is meant that this layer comprises synthetic material, as well as, in applied condition, is sufficiently transparent for perceiving the printed wood pattern. This layer of synthetic material itself may comprise other materials than synthetic material, as well as be composed of several sublayers.

Preferably, this transparent layer of synthetic material, as usual with known laminated parquet panels, consists of a synthetic resin or one or more transparent or translucent material layers soaked in synthetic resin, for example, very thin transparent layers of paper.

In the layer of synthetic material, substances may be present by which the wear and tear resistance of the surface is enhanced.

Although the invention aims at impressions which substantially follow the printed wood pattern, it is evident that this inventive idea can be realized in different ways.

So, for example, impressions can be applied which are bent or curved and which follow the bent shapes of the wood pattern.

Also, opposite to the known embodiments, whereby mostly relatively short impressions are applied, now longer impressions can be applied, for example, with lengths of 3 cm or more, or even over the entire length of a wood nerve.

It is noted that by the term "wood pattern", different aspects of such wood pattern can be understood. So, for example, may the impressions, or at least a number of the impressions, be provided in function of the course of the wood nerves of the printed wood pattern, however, according to a variant, which either can be combined with the preceding or not, impressions are provided which are applied in function, and more particularly at the location, of the so-called wood pores of the printed wood pattern. Wood pores mostly are dark, often strip-shaped specks in wood, which up to now have been particularly difficult to imitate. In the first place, this problem is pertinent when imitating oak, where often less nerves are present, however, the wood pores are very important. By providing, according to the invention, impressions at the location of these wood pores, the imitated specks will almost have the look or real pores.

In the most preferred forms of embodiment, the floor covering, and more particularly each floor panel concerned, will be provided with impressions forming an embossment which are obtained by means of a pressing mould, more particularly pressing plate, the relief of which was realized by means of image-processing technology, starting from a wood pattern, either an image of a wood pattern or a real wood pattern. Hereby, one starts from the same wood pattern than the one of the print of the decorative layer, and effectively embosses each floor panel.

Of course, the invention also relates to floor panels for realizing the floor covering described in the aforegoing.

Further, the invention also relates to a method for realizing such floor panel, which method is characterized in that the aforementioned impressions are applied in said layer of synthetic material by means of a pressing mould, more particularly a pressing plate. Of course, the pressing plate is provided with a relief, more particularly protruding parts, such that impressions are formed which, as aforementioned, follow the printed wood pattern and/or are realized in function of this wood pattern.

Preferably, hereby use is made of a pressing mould, more particularly a pressing plate, the relief of which was realized by means of image-processing technology, starting from a wood pattern, either an image of a wood pattern or a real wood pattern. By realizing said relief by means of image-processing, a true copy is obtained. More particularly, for forming, on one hand, the pressing plate and, on the other hand, the patterns to be printed, it is started from one and the same wood pattern, with the advantage that the relief and the printed pattern can be perfectly attuned to each other.

Of course, the results obtained by image-processing can be processed further.

It is also not excluded to determine the locations where the impressions have to be realized and therefore also the relief of the pressing plate in other ways, for example, by starting from an image of a wood pattern, to determine the locations and shapes of the desired impressions, either by means of or with the support of a computer program.

According to the invention, during image-processing, preferably a separation is performed, on one hand, for forming one or more image layers and, on the other hand, for forming one or more structural layers. A separation for image layers already is a known technique and is necessary for being able to print the different colours. According to the invention, now still an additional separation is performed for the aforementioned structural layers, in other words, for forming said relief at the pressing plate or such. To this end, an image of the wood pattern is made and, by means of image-processing technology, an image is formed therefrom which determines the position, and possibly also the depth and the size, of the impressions, after which, by means thereof, a pressing plate is realized, for example, by means of etching techniques or any other technique. It is evident that for the image processing for creating, starting from, for example, the pattern of a real piece of wood, an image which is suitable for forming the relief, different image-processing programs, possibly especially designed to this aim can be applied.

Preferably, the floor panels are realized according to the classical technique which is applied for forming DPL (Direct Pressure Laminate), with the only difference that a pressure mould, more particularly, a pressing plate is applied in the usual production press which is provided with a relief by which impressions, such as mentioned in the aforegoing, are formed. As usual, the floor panels hereby are formed from larger plates. These plates are formed by bringing a basic layer, more particularly a base plate, together with the decorative layer and the layer of synthetic material, and possible other layers, in a heated press and compressing them to a whole, whereby said synthetic resins provide for adhesion and hardening. Simultaneously to pressing, the impressions are applied, as the press, at the surface of the pressing part which comes into contact with the upper side of the aforementioned plate, is provided with said pressing plate comprising the relief which is necessary for applying impressions in accordance with the invention.

Preceding the pressing, according to the present invention, preferably a positioning is performed between, on one hand, the decorative layer and, on the other hand, the applied pressing plate, in order to position the printed pattern on the decorative layer and the pattern present at the pressing plate over each other.

Practically, the positioning preferably is performed by shifting the base plate, together with the decorative layer and the layer of synthetic material present thereupon, until they obtain the desired position.

The aforementioned positioning may be performed in different manners, however, it can be realized in a particular manner by performing such positioning by means of one or more marks provided on the decorative layer.

BRIEF DESCRIPTION OF THE DRAWINGS

With the intention of better showing the characteristics of the invention, hereafter, as an example without any limitative character, several preferred forms of embodiment are described, with reference to the accompanying drawings, wherein.

DETAILED DESCRIPTION OF PREFERRED EMBODIMENTS

Figure 1:
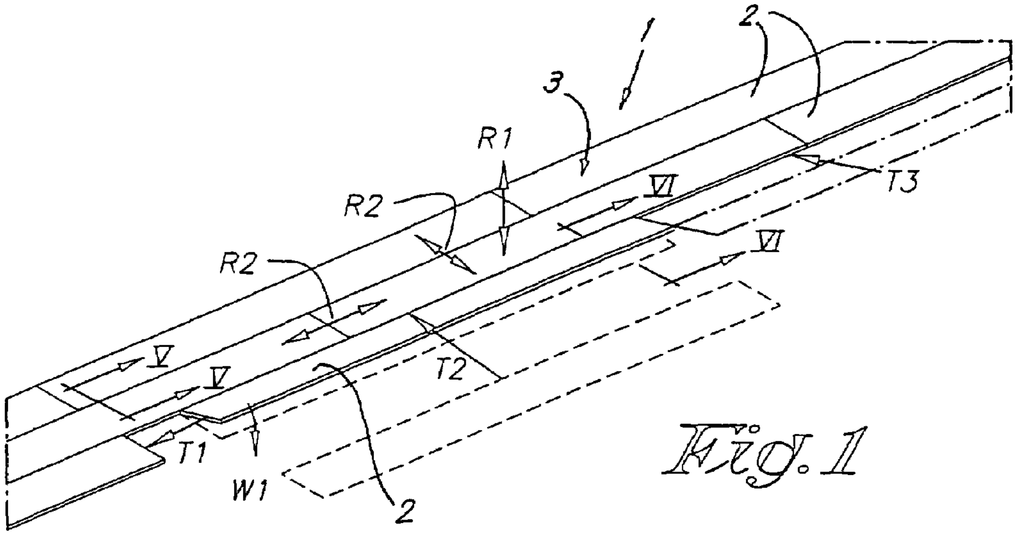
FIG. 1 schematically represents a part of a floor covering which is composed of panels according to the invention.
Figure 2:
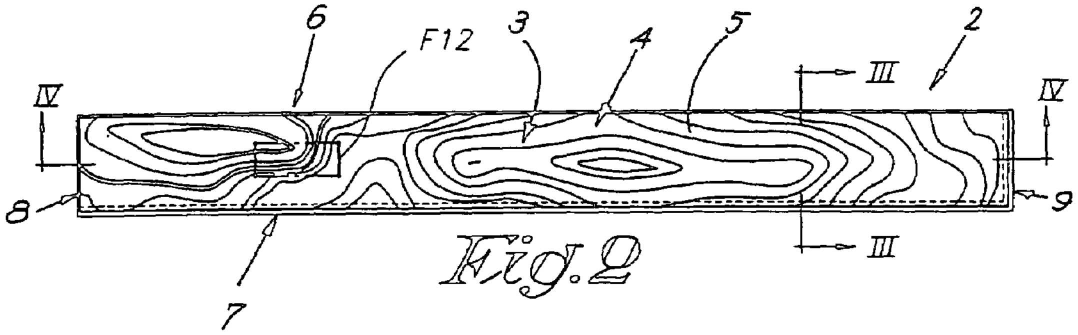
FIG. 2 represents a panel of the floor covering from FIG. 1 in plan view.
Figure 3:
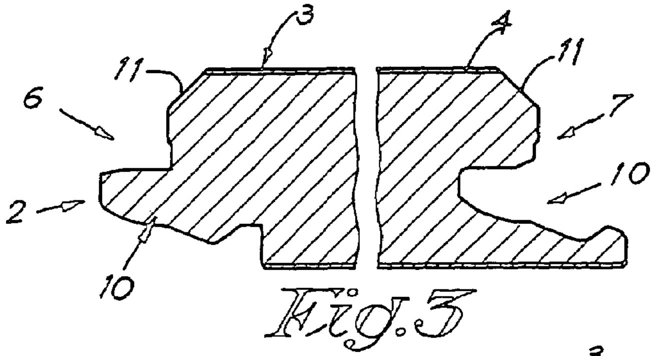
FIGS. 3 and 4 represent cross-sections according to lines III-III and IV-IV in FIG. 2, respectively.
Figure 4:
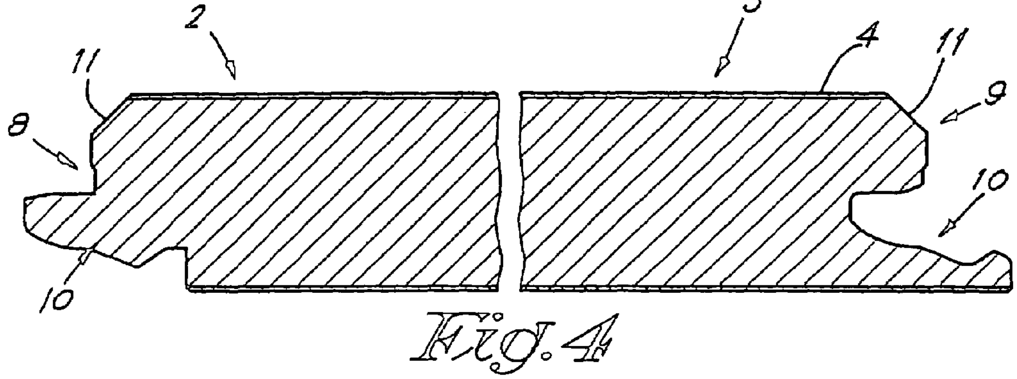

As represented in FIGS. 1 and 2, the invention relates to a floor covering 1, as well as to hard panels, more particularly floor panels 2, from which such floor covering 1 is assembled, whereby these floor panels 2, at their top side 3 or decorative side, are provided with a top layer 4 with a printed wood pattern 5.

In the represented example, the floor panels 2 are rectangular, however, it is clear that they, according to not-represented variants, also can have another shape, for example, can be square or polygonal.

Preferably, the floor panels 2, at least at two opposite edges 6-7, and even better, as represented in FIGS. 2 to 8, at both pairs of edges 6-7, 8-9, respectively, are provided with coupling means 10, by means of which several of such floor panels 2 mutually can be coupled, such that these coupling means 10 provide for a locking according to a direction R1 perpendicular to the plane of the floor covering 1, as well as in a direction R2 perpendicular to the edges 6-7 and/or 8-9 concerned and parallel to the plane of the floor covering 1. A generally planar interior region is defined on the topside 3 of the panel 2 between the first and second pairs of edges 6-7, 8-9.

Figure 6:
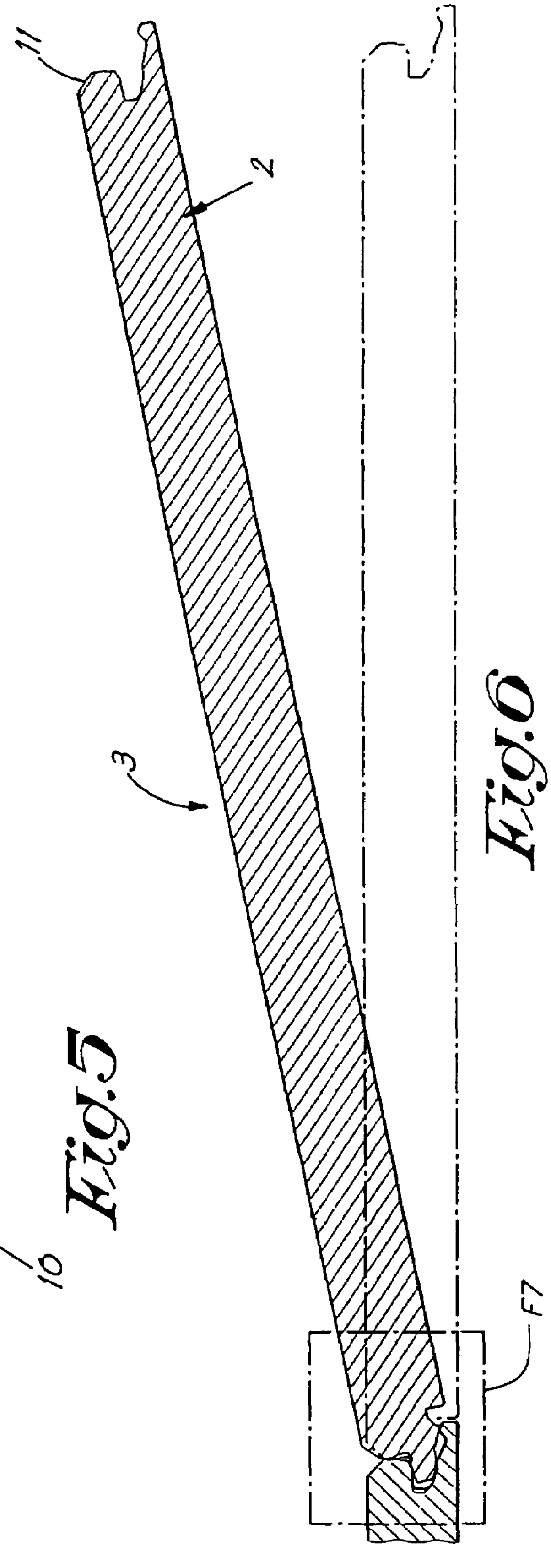
FIG. 6, at a larger scale, represents a cross-section according to line VI-VI in FIG. 1.
Figure 5:
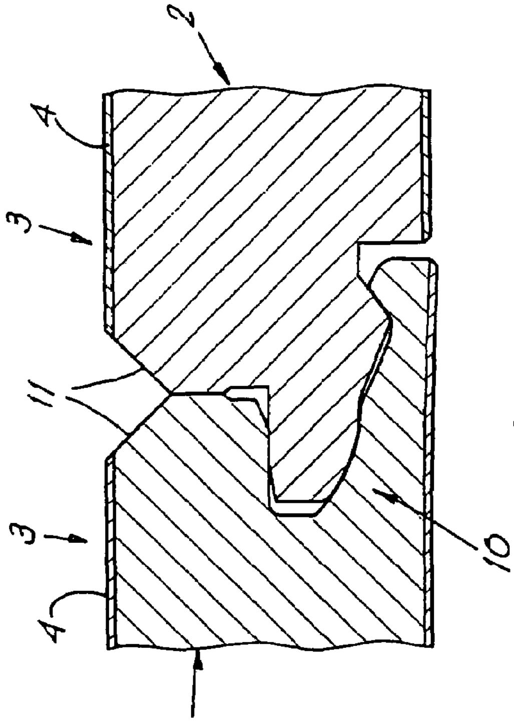
FIG. 5, at a larger scale, represents a cross-section according to line V-V in FIG. 1.
Figure 7:
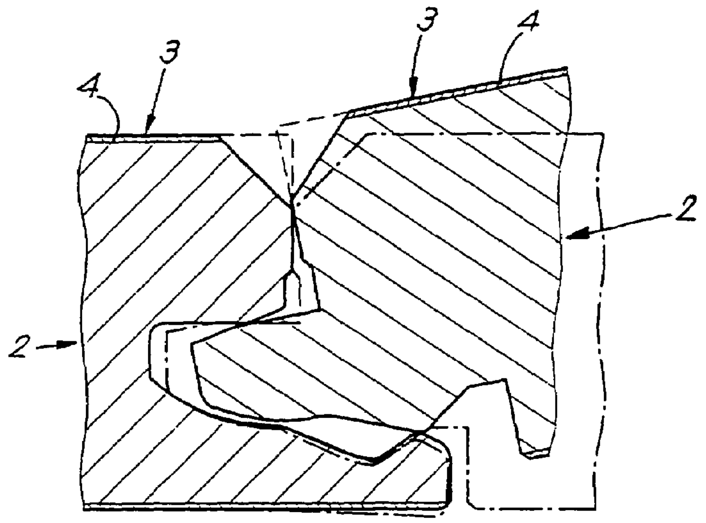
FIG. 7, at a larger scale, represents the part indicated by F7 in FIG. 6.
Figure 8:
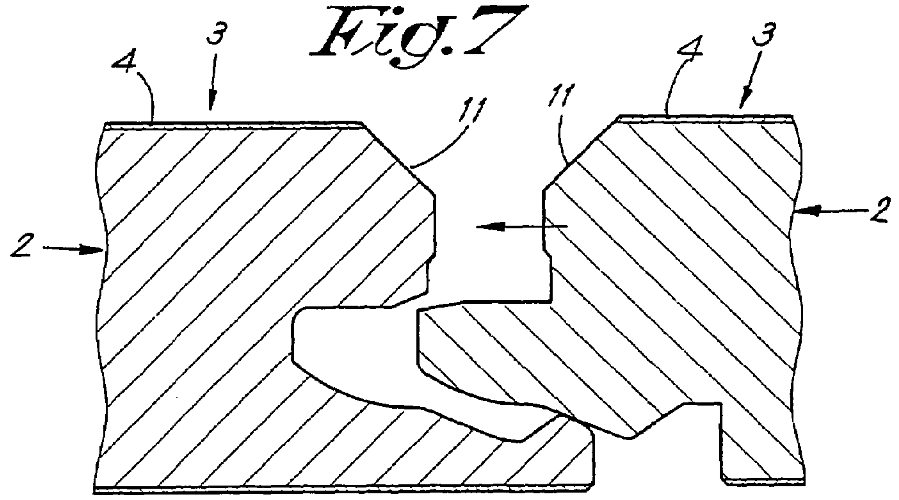
FIG. 8 represents a view analogous as in FIG. 7, but whereby the panels are shifted towards each other substantially in one and the same plane.

Hereby, such coupling means 10 can be realized such that the different floor panels 2 mutually can be coupled by means of translation movements T1 and/or T2 and/or pivoting movements W1, such as indicated in FIG. 1, as well as made clear in FIGS. 6 to 8.

Such coupling means 10 which allow a glue-free mutual coupling of the floor panels 2, as well as an uncoupling thereof, are already known in themselves from the international patent application WO 97/47834.

It is noted that the present invention, however, is not limited to floor parts with coupling means 10 which provide for a mechanical locking in the directions R1 and R2, but in fact also can relate to floor panels which are provided with other coupling means, for example, with a classical tongue and groove which can be glued into each other, or even to floor panels comprising no coupling means at all.

Figure 9:
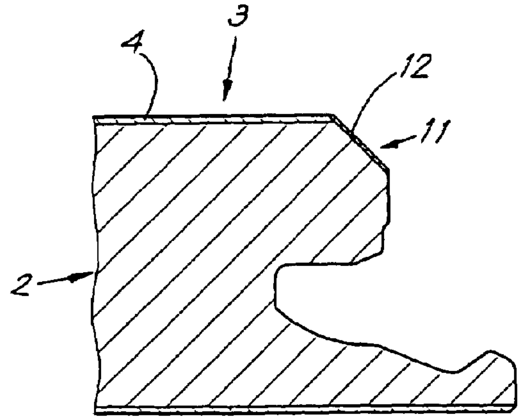
FIG. 9, in cross-section, represents another panel according to the invention, with bevels provided with a print.
Figure 10:
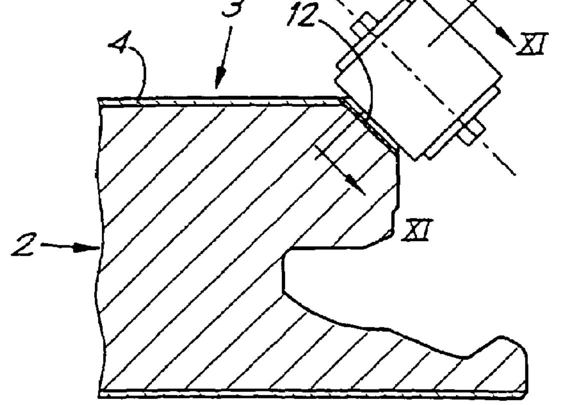
FIG. 10, schematically represents how the print in the embodiment of FIG. 9 can be provided.
Figure 11:
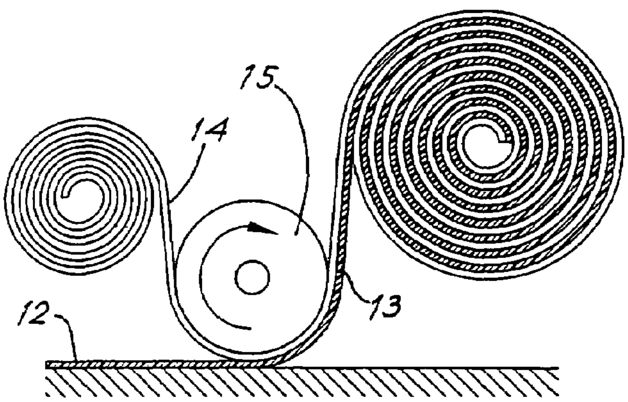
FIG. 11 schematically represents a cross-section according to line XI-XI in FIG. 10.

Besides, the floor panels 2 either can be provided with additional particularities or not, such as an edge contour defined by bevels 11 at the upper edges, for example, such as represented in FIGS. 3 to 10, on which, as specifically illustrated in FIGS. 9 to 10, either a decorative layer 12 is provided or not, for example, by means of transfer printing, whereby, such as schematically represented in FIGS. 10 and 11, a print layer 13, which is present on a carrier, is transferred to the surface of the bevels 11, for example, by means of a heated pressing roll 15.

Figure 12:
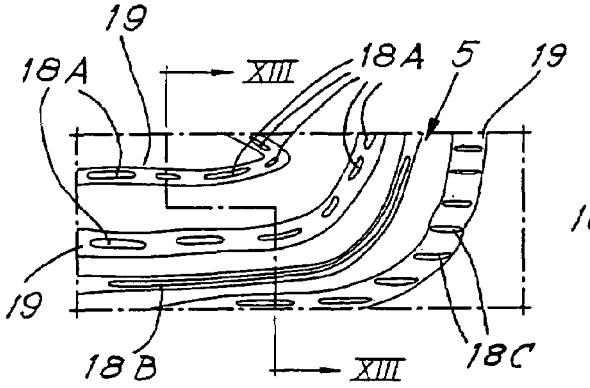
FIG. 12, at a larger scale, represents the upper surface of a floor panel according to the invention, in particular the part indicated by F12 in FIG. 2.
Figure 13:
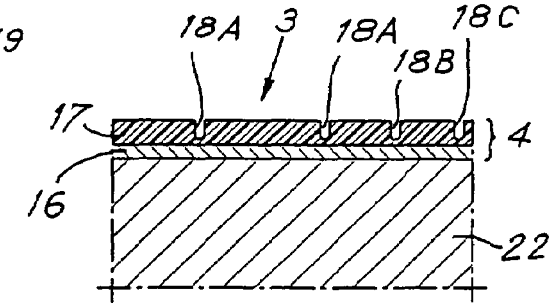
FIG. 13 represents a cross-section according to line XIII-XIII in FIG. 12.

The actual invention to which the present application is relating, is represented schematically in FIGS. 12 and 13.

The particularity thereby consists in that at the top side of the floor panels 2, a decorative layer 16 is present, with thereover a transparent layer of synthetic material 17, in which impressions 18A-18B-18C are formed thereby forming an embossment. Hereby, the decorative layer 16 and the layer of synthetic material 17 are of the kind as described in the introduction and together form the top layer 4 indicated schematically in FIGS. 3 to 10.

According to the invention, the impressions 18A-18B-18C follow the printed wood pattern 5, preferably substantially in longitudinal direction as well as substantially in transverse direction and in directions situated in between.

As represented in FIG. 13, the impressions 18A-18B-18C preferably only extend up to such a depth that they are situated above the printed decorative layer 16.

As indicated by 18A and 18C, the impressions may consist of successive short impressions, or, as represented by 18B, of longer, uninterrupted, possibly bent impressions. Of course, other designs are not excluded. However, it is important that the location and/or shape of the impressions is in function of the wood pattern 5, with which it is meant in the first place that these impressions are realized in function of the wood nerves and/or in function of the wood pores.

In the case of short impressions, these, such as indicated by 18A, can be directed with their length according to the printed wood nerve 19 or, as indicated by 18C, also be directed with their longitudinal direction otherwise, however, positioned such that their configuration globally follows the wood nerve 19.

It is noted that the three possibilities of impressions 18A-18B-18C represented in FIG. 12 are not limitative. Also, these will normally not be applied in combination with each other, but one well-defined type 18A or 18B or 18C or another configuration will be used.

According to a variant, the impressions, instead of at the wood nerve 19 itself, also can be situated in the zones formed therebetween, and/or at the transitions between the wood nerve 19 and the zones situated therebetween and/or at locations where so-called wood pores are depicted.

Figure 14:
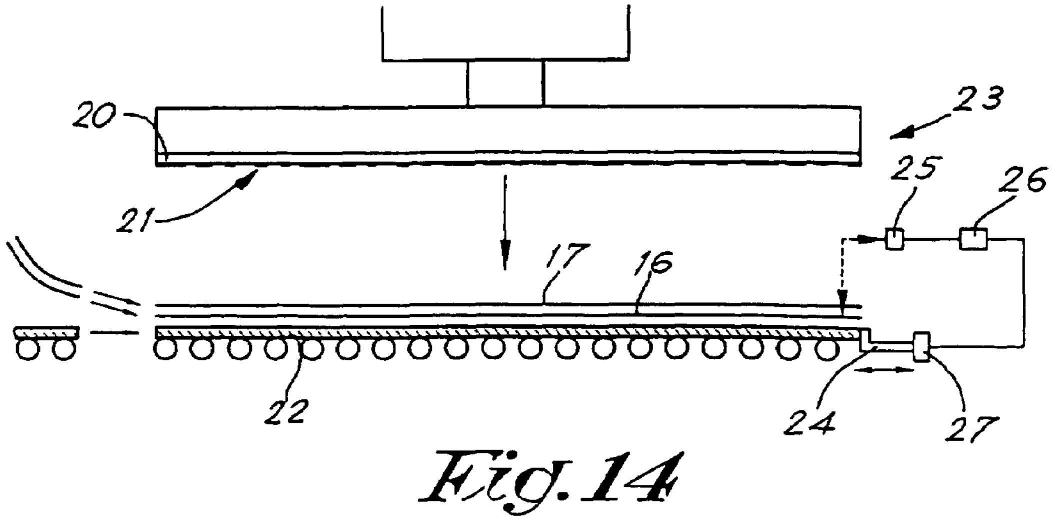
FIG. 14 schematically represents how plates can be realized from which floor panels according to the invention can be formed.

In FIG. 14, a form of embodiment of the method of realizing said floor panels 2, described in the introduction, is represented schematically.

As represented, the impressions concerned, for example 18A and/or 18B and/or 18C, hereby are formed by using a pressing mould, more particularly a pressing plate 20, which, at the side intended for coming into contact with the products to be treated, is provided with a suitable relief 21.

First, during production, large plates are manufactured, from which several floor panels 2 can be formed, more particularly can be sawn therefrom, which subsequently can be provided with coupling means 10, for example, by means of a milling treatment.

For forming said plates, as schematically represented in FIG. 14, at least a printed decorative layer 16 and a layer of synthetic material 17 are provided on a base plate 22, such in a press 23, after which the whole is compressed by means of the pressing plate 20, preferably while supplying heat.

According to the invention, previous to pressing, a positioning is performed between, on one hand, the decorative layer 16 and, on the other hand, the applied pressing plate 20, in order to position the printed pattern on the decorative layer 16 and the pattern present at the pressing plate 20 over each other.

In the example, this positioning is performed by shifting the base plate 22, together with the decorative layer 16 and layer of synthetic material 17 present thereon, until the desired position is achieved. This positioning is realized by means of one or more adjustable stops 24 against which the base plate 22, with the decorative layer 16 and layer of synthetic material 17 present thereupon, and possible other layers, is positioned, possibly by means of marks which are applied on the decorative layer 16, which are perceived by means of one or more sensors 25, and whereby, by means of control means 26 and in function of the signals obtained from the sensors, it is provided for the control of driving means 27 of the movable stops 24.

Obviously, the positioning can be achieved in the two directions of the plane of the base plate 22.

It is evident that, according to a variant, the layer of synthetic material and the decorative layer, already before their application on the base plate, may consist of a single layer, for example, in that the decorative layer is soaked such that sufficient synthetic material is present thereupon in order to form impressions therein. It is also not excluded to start from a layer of synthetic material which is provided with a decorative layer at the underside, which layer is exclusively formed by a print. The term print must be interpreted in the broadest sense, and thereby any technique is intended with which an image of a wood pattern can be realized.

Also, other layers may be taken up in the top layer, such as, for example, a layer of white paper, also impregnated with resin, which is provided under the decorative layer, which has the purpose of forming a neutral underground.

The present invention is in no way limited to the forms of embodiment described as an example and represented in the figures, on the contrary may such floor covering, and more particularly said panels, as well as said method, be realized in different variants without leaving the scope of the invention.

The invention claimed is:

1. A laminate floor covering panel having a perimeter defining first and second pairs of opposite edges, and defining a length;

said panel having a top side and a bottom side, and comprising a base plate and a top layer;

said base plate having an upper side and a lower side;

said top layer comprising a decorative layer;

said decorative layer comprising a printed wood pattern, the wood pattern depicting a first wood nerve extending in a first direction generally parallel to the length of the floor panel and in a second direction bending relative to the first direction;

said top layer defining a transparent or translucent synthetic layer extending over said decorative layer;

said synthetic layer at least partially forming said top side of the panel;

said top side of the panel comprising an edge contour located adjacent to said first and second pairs of opposite edges, and a generally horizontal and planar interior region extending over the upper side of the base plate and surrounded by the edge contour, the edge contour extending obliquely relative to and downwardly from the interior region to at least one edge of one of the first or second pairs of opposite edges located below the upper side of the base plate;

wherein the panel is rectangular and oblong in shape such that the first pair of edges are long and extend in a longitudinal direction relative to the floor panel length, and the second pair of edges are short and extend in a transverse direction relative to the floor panel length and relative to the first pair of edges;

wherein said synthetic layer comprises impressions, said impressions being generally aligned in the longitudinal direction and arranged to simulate unevennesses over a substantial part of said top side of the panel and wherein a plurality of said impressions form a configuration of successive impressions that follow the first wood nerve of the wood pattern in location and shape, said configuration of successive impressions extending in the longitudinal and transverse directions relative to the length of the panel, and in directions between the longitudinal and transverse directions, said configuration of successive impressions following the first wood nerve at least along the first and second directions of the first wood nerve;

wherein said edge contour adjacent at least one edge of one of the first or second pairs of opposite edges is free from said impressions;

wherein said panel is arranged to mutually couple with a second panel to form a floor covering, the floor covering having an upper surface such that the upper surface of the floor covering includes the top side and downwardly extending edge contour of both of said panel and the second panel.

2. The laminate floor covering panel of claim 1, wherein said edge contour is adjacent both edges of said first pair of edges and is free from said impressions in register with said printed wood pattern.

3. The laminate floor covering panel according to claim 2, wherein said edge contour is located along said panel perimeter and is free from said impressions in register with said printed wood pattern.

4. The laminate floor covering panel according to claim 2 or 3, wherein said base plate is formed of a material selected from the group consisting of MDF and HDF.

5. The laminate floor covering panel according to claim 2 or 3, wherein said panel at least at said first pair of opposite edges is provided with coupling parts for mutually coupling said panel and said second panel to each other in a common plane to form a floor covering, wherein said coupling parts in coupled condition of two of such panels provide for an interlocking in a direction perpendicular to the plane of the panels as well as in a direction perpendicular to the edges concerned and parallel to the plane of the panels.

6. The laminate floor covering panel according to claim 5, wherein said panel at both of said pairs of opposite edges is provided with coupling parts for mutually coupling said panel and said second panel to each other in a common plane to form a floor covering, wherein these coupling parts in coupled condition of said panel and said second panel provide for an interlocking in a direction perpendicular to the plane of the panels as well as in a direction perpendicular to the edges concerned and parallel to the plane of the panels.

7. The laminate floor covering panel according to claim 2 or 3, wherein said synthetic layer comprises wear and tear resistant substances.

8. The laminate floor covering panel according to claim 2 or 3, wherein the edge contour is free of said impressions due to the presence of a bevel formed at the respective edges.

9. The laminate floor covering panel according to claim 1, wherein at least two of the impressions arranged in a generally side-by-side orientation as the first wood nerve of the printed wood pattern has a portion oriented generally in the transverse direction of the floor panel.

* * * * *